United States Patent
Yarnavick

[19]

[11] Patent Number: 5,820,192
[45] Date of Patent: Oct. 13, 1998

[54] TRAILER CROSS BRACE AND TOP RAIL SYSTEM

[75] Inventor: Joseph T. Yarnavick, Johnstown, Pa.

[73] Assignee: Somerset Welding & Steel, Inc., Somerset, Pa.

[21] Appl. No.: 778,482

[22] Filed: Jan. 3, 1997

[51] Int. Cl.⁶ ..................................................... B60P 7/04
[52] U.S. Cl. ............................................. 296/40; 296/104
[58] Field of Search ............................ 296/40, 101, 102, 296/100, 104, 120.1

[56] References Cited

U.S. PATENT DOCUMENTS

| | | |
|---|---|---|
| 2,371,497 | 3/1945 | Black . |
| 2,425,875 | 8/1947 | Hermann . |
| 2,576,397 | 11/1951 | Grilley ...................................... 296/40 |
| 2,679,432 | 5/1954 | Ruth . |
| 2,971,797 | 2/1961 | Watters . |
| 3,897,972 | 8/1975 | Logue . |
| 3,971,590 | 7/1976 | Yglesias . |
| 3,977,719 | 8/1976 | Thurston .................................. 296/98 |
| 4,902,065 | 2/1990 | Thralls . |
| 5,697,663 | 12/1997 | Chenowth ................................ 296/98 |

*Primary Examiner*—Stephen Avila

[57] ABSTRACT

A bulk material container, such as a trailer, includes an improved cross brace and top rail system including roller-type cross brace assemblies. The rear and center cross brace assemblies advantageously include a support tube, an outer loosely mounted roller, and two mounting brackets. The tube serves as the lateral support for the trailer; the ends being held in brackets attached to the top rails. The roller is mounted loosely over the tube and is free to rotate and/or to be lifted vertically, thereby preventing tightly packed bulk cargo material from becoming lodged against the braces during the unloading process. The top rails are extrusions with different portion thicknesses designed to minimize the weight while still providing sufficient strength to withstand the forces exerted during loading.

7 Claims, 3 Drawing Sheets

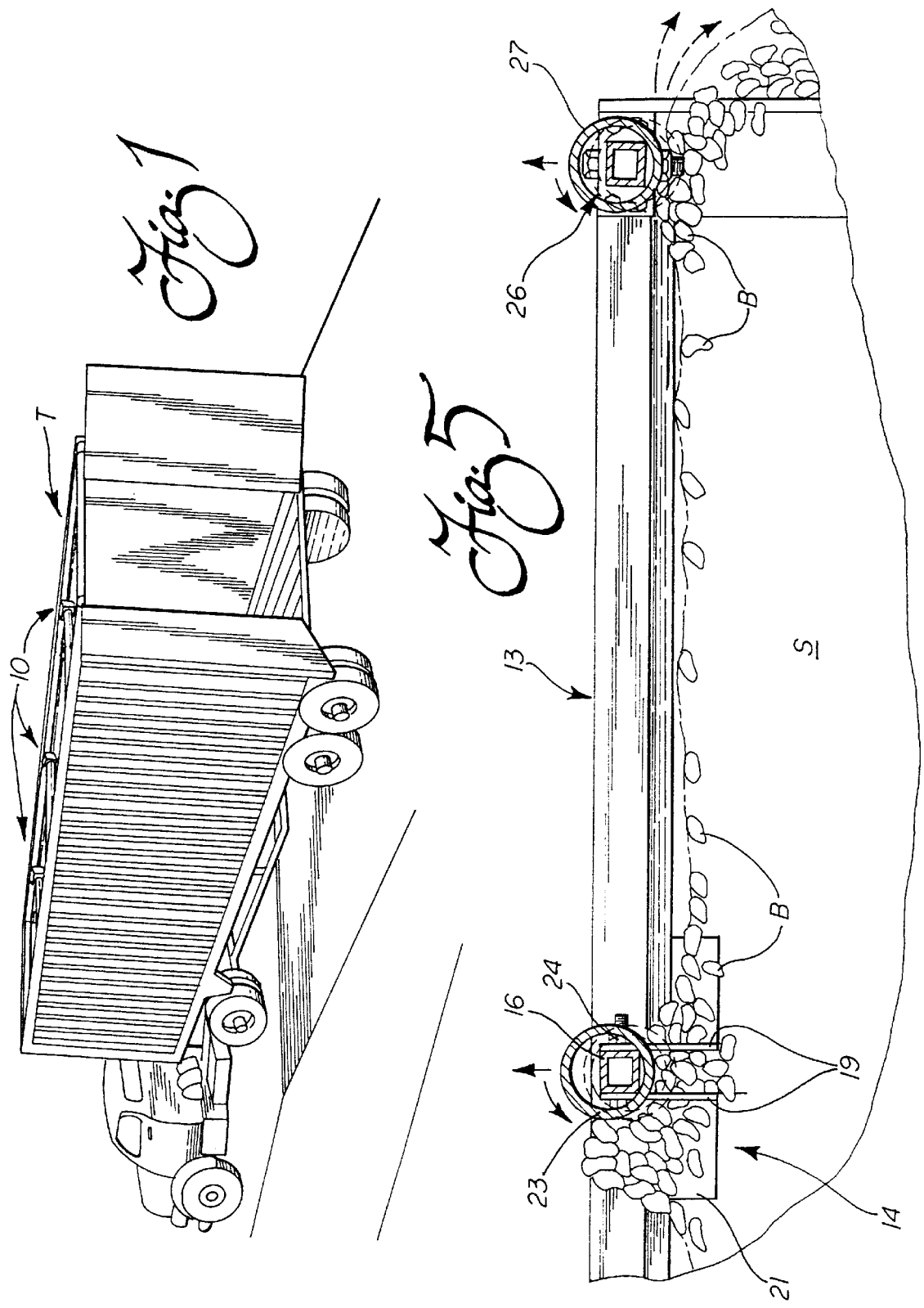

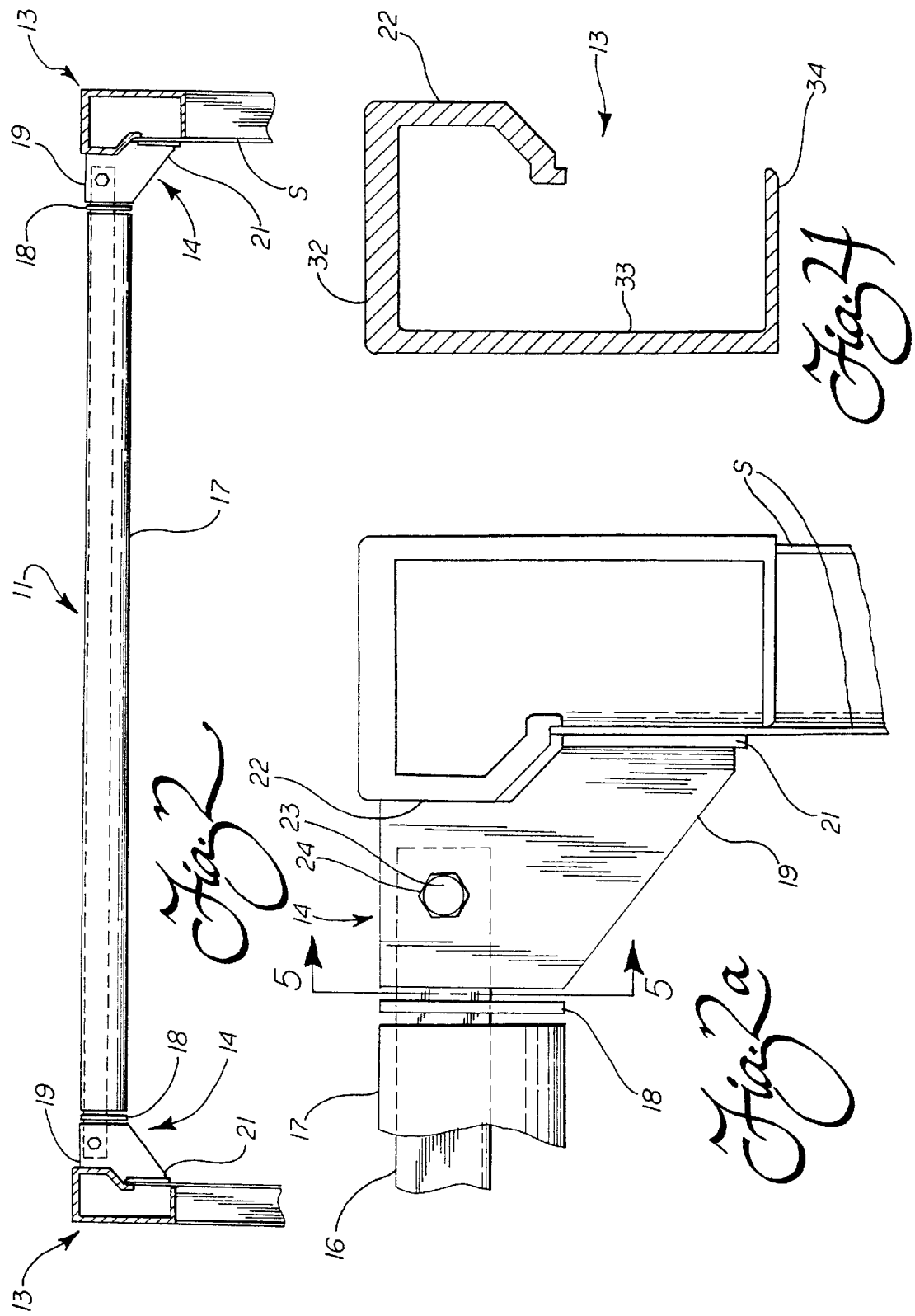

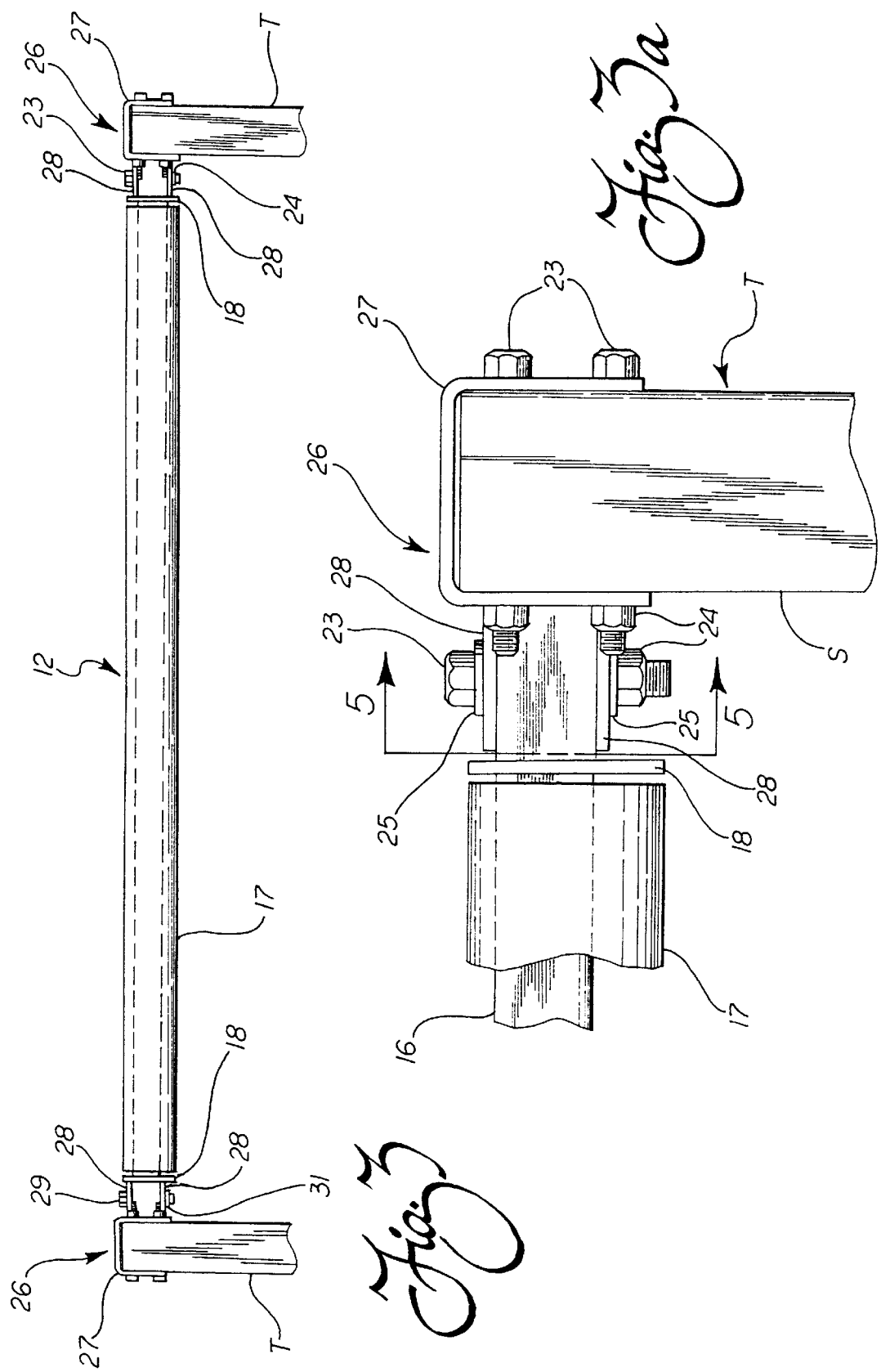

TRAILER CROSS BRACE AND TOP RAIL SYSTEM

TECHNICAL FIELD

The present invention relates generally to containers for hauling bulk material; and more particularly to a bulk material container having an improved cross brace and top rail system, including cross brace assemblies of a roller-type construction supported by unique top rails and brackets, and especially designed to improve the process of loading and unloading of cargo.

BACKGROUND OF THE INVENTION

A typical bulk material container, such as a trailer, is designed to be loaded from the top using a front end loader or the like. Once loaded, the bulk material or cargo, such as refuse, is transported to its destination and unloaded either by raising the front end of the trailer with a hydraulic lift and dumping the cargo, or by utilizing a reciprocating or walking floor conveyor to transition the cargo out of the rear of the trailer.

In a typical trailer with a reciprocating floor conveyor, a majority of elongated floor members are hydraulically driven in unison toward the rear of the trailer in order to frictionally engage and convey the cargo. The floor members are then sequentially retracted to their original position in a manner which prevents retraction of the cargo. This conveying process is repeated until the cargo is completely unloaded through the rear of the trailer.

A significant shortcoming in existing bulk material trailers, and specifically walking floor trailers, is the retarding or stoppage of the unloading process caused by obstructions created by the trailer cross brace assemblies. A typical bulk material trailer cross brace assembly includes a rigid bar, tube or cable spanning between the top rails and the rear cornerposts of the trailer. These fixed-type cross brace assemblies often create obstructions against the top layer of the cargo material during the unloading process. These obstructions slow or prevent the movement, initiated by the walking floor, or the dumping action, of the cargo towards the rear of the trailer. More particularly, as the cargo progresses toward the rear of the trailer, it can become lodged against the fixed cross brace assemblies creating an obstruction. These obstructions invariably lead to a retarding or even a complete stoppage of the unloading process. When this occurs workers are required to manually assist the unloading process, for example, by climbing onto the trailer and shoveling the material away from the fixed cross brace assemblies.

In addition to creating obstructions during the unloading process, typical fixed cross brace assemblies can also hinder the loading process. As noted above, bulk material is loaded into the top of the trailer. Depending on the specific type of bulk material being loaded, the fixed cross brace assemblies can sometimes cause the material to hang up and become blocked. Again, workers are required to manually remove the bulk material from atop the cross brace assemblies.

Another shortcoming in existing bulk material trailers, including walking floor trailers, is the design of the top rails and support brackets. A typical bulk material trailer top rail includes a simple, extruded L-shaped rail of uniform thickness, or two L-shaped beams of uniform thickness welded together to form a box configuration. The top rails are supported by the cornerposts and side walls of the trailer, with the braces being simply welded at spaced locations.

A standard extrusion having a uniform thickness is undesirable for bulk material trailers due to the lack of protection against damage during the loading process. Any attempt to make these prior art top rails sturdier would only result in the addition of unnecessary excess material. An excess of material in a trailer design directly correlates to an increase in cost and weight. Of course, this additional weight decreases the fuel efficiency, thereby increasing operating costs over the life of the trailer.

Thus, as demonstrated by the limitations of the prior art containers, there is a need identified for an improved cross brace and top rail system which allows bulk material to be loaded/unloaded with greater efficiency, as well as, being resistant to damage to the container during the loading process and at the same time relatively lightweight.

SUMMARY OF THE INVENTION

Accordingly, it is a primary object of the present invention to provide a novel and improved cross brace and top rail system that is particularly adapted for use with bulk material containers/trailers and includes concepts and features that are designed to overcome the limitations of the prior art.

Another object of the present invention is to provide a container wherein obstruction caused by the cross brace assemblies during the unloading process is substantially eliminated due to roller assistance, thus obviating the need for manual assistance.

It is another object of the present invention to provide a container wherein obstruction by the cross brace assemblies is also substantially eliminated during the loading process since the material can easily slide over the assemblies during free-fall into the container.

It is still another object of the present invention to provide a cross brace and top rail system wherein the extruded top rails that support the brace assemblies include a unique, cross-sectional profile, the upper portion having the maximum thickness to distribute maximum material and strength where needed in order to prevent damage during the loading process, while at the same time minimizing the overall weight.

It is yet another object of the present invention to provide a cross brace and top rail system wherein the top rails support the cross braces in a new and improved manner through inverted T-shaped brackets to further enhance the overall performance of the system.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a novel and improved cross brace and top rail system is provided that is particularly adapted to use with bulk material containers, such as trailers, and more specifically with walking floor type trailers. As described in greater detail below, the improved system includes center and rear roller-type cross brace assemblies which allow cargo to be loaded and unloaded without obstruction. Top rail extrusions provide maximum strength along the upper portion and support the cross braces through inverted T-shaped brackets, all designed to minimize the amount of material required and, therefore, the overall weight and cost of the system.

BRIEF DESCRIPTION OF THE DRAWINGS

FIG. 1 is a perspective view of a typical bulk material trailer.

FIG. 2 is a front view of a center cross brace assembly showing the roller-type construction and the attachment of the cross brace to the top rails of the present invention.

FIG. 2a is an enlarged detail view of a portion of the cross brace and top rail system showing the bracket for attachment of the cross brace assembly to the top rail.

FIG. 3 is an overall elevational view of the rear cross brace assembly showing the roller-type construction and the attachment to the trailer rear cornerpost and the trailer side walls.

FIG. 3a is an enlarged detail view of the bracket mounting of the rear cross brace assembly to the trailer rear cornerpost and the trailer side walls.

FIG. 4 is an enlarged cross section of the top rail extrusion showing the unique profile that provides the improved performance.

FIG. 5 is a longitudinal cross-sectional view showing a center and rear cross brace and top rail system of the present invention taken along line 5—5 of FIG. 3a and illustrating the improved unloading action of bulk material cargo.

Reference will now be made in detail to the present preferred embodiment of the invention, an example of which is illustrated in the accompanying drawings.

DETAILED DESCRIPTION OF THE PREFERRED EMBODIMENT

Reference is now made generally to FIGS. 1–5 which illustrate an improved cross brace and top rail system 10, including center and rear roller-type cross brace assemblies 11, 12 and top rail extrusions 13. As shown in FIG. 1, the cross brace and top rail system 10 is particularly adapted for use in a bulk material container, such as a trailer T, and more specifically for use in a walking floor type trailer to prevent any obstruction caused by the cross braces during the loading or unloading process.

As best shown in FIG. 5, the system 10 is characterized by the ability of the cross brace assemblies 11, 12 to move relative to bulk material cargo B as it passes underneath during the unloading process. It is to be understood that the trailer T can improve the handling of any form of bulk material cargo, such as refuse, wood chips, or other agricultural products.

In the preferred embodiment, the center cross brace assemblies 11 and a rear cross brace assembly 12 advantageously provide a roller-type or rotary function which best accomplishes the objectives of relative movement. In addition, the cross brace assemblies are free to move vertically relative to the undulating cargo passing underneath. Thus, the obstructions that might otherwise be caused during the loading or unloading process are eliminated.

As illustrated in FIGS. 2 and 2a, the center cross brace assemblies 11 are pivotally fastened, such as by shoulder bolts and nuts 23, 24 bolted at both ends to mating brackets 14, which are in turn welded to the sidewalls of the trailer T and top rail extrusions 13. This arrangement holds the side walls secure, but allows slight pivoting action at the ends to relieve stresses caused by shifting loads and/or cornering during travel.

Each cross brace assembly 11 includes an inner support tube 16 and an outer roller 17 freely supported along its length on the tube. As is evident from the above discussion, the tube 16 provides lateral support to the sidewalls S of the trailer T, as well as, serving as the axle for the loosely fitting roller 17. The loose nature of the roller advantageously allows for the free rotational and limited vertical movement relative to the cargo during the unloading process. Thus, there is no provision needed for fixedly mounting the ends of the roller 17, such as by providing standard roller bearing support. In other words, the roller 17 on the tube 16 gives not only the desired free rotational action, but also the freedom limited vertical and lateral tilting and shifting action as the material moves underneath. As will be apparent, an added advantage coming from this mounting technique is the elimination of potentially costly regular maintenance and repairs due to potential bearing failure, such as caused by foreign pieces of the bulk material or the like becoming lodged in such bearings through a failed seal.

Two endcaps 18 are welded to the support tube 16 at a point adjacent the ends of the roller 17. The endcaps 18 are generally circular and are positioned to match the ends of the roller 17 when there is no upward pressure by the cargo passing underneath. The endcaps 18 are designed to limit lateral movement, while at the same time allowing for free and unobstructed rotational and vertical movement by the roller 17.

As best shown in FIG. 5, each of the brackets 14 is formed as an inverted T including upwardly extending support arms 19; one arm being situated on either side of the tube 16. The cross piece of the brackets is formed by a load bearing plate 21, which is welded to the inner panel of the side wall S of the trailer T at a location adjacent each side post for stability. Secondary support is provided by the upper edges 22 of the top rail extrusions 13. The load bearing plates 21 are designed to distribute both the lateral forces of the trailer and the weight of the cross brace assembly 11 across a sufficient area of the inner panel of the side wall to prevent damage to the trailer.

As further illustrated in FIGS. 3 and 3a, the rear cross brace assembly 12 is supported by rear bracket assemblies 26. The rear bracket assemblies 26 are attached by the shoulder bolts 23/nuts 24 to the rear cornerposts.

The rear bracket assemblies 26 include inverted U-shaped brackets 27 and two horizontal arms 28. Each horizontal arm 28 is welded to the outside lower portion of the inverted U-shaped brackets 27.

The top rail extrusions 13 are advantageously designed to have a cross section with upper, side and lower portions each having differing thicknesses. The unique thicknesses of each portion best serves to accomplish the objectives of preventing damage during the loading process and limiting the amount of material utilized and thereby, the overall weight of the rail and cost of operating the trailer (see FIG. 4).

For example, the upper portion 32 is designed to have a uniform maximized thickness of ¾ inch. This maximized thickness provides the increased strength necessary to substantially eliminate damage to the top rail 13 caused by inadvertent contact of a front end loader or the like during the loading process. Additionally, the thickness of the inner side portion 22 and the outer side portion 33 is reduced to ½ inch and the bottom portion 34 is further reduced to a ¼ inch thickness. These unique portions, while minimizing the amount of material utilized and therefore the overall weight, are designed to provide optimal strength in each of the designated areas.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, various roller assemblies could be used in place of the tube and roller of the preferred embodiment of the present invention to provide a roller-type movement of the cross braces. The embodiment was chosen and described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A cross brace and top rail system for use in a bulk material container to prevent damage to said container and to remove obstructions to cargo during loading and unloading, comprising:

first and second top rails;

a brace having first and second ends, said first end supported relative to said first top rail, said second end supported relative to said second top rail; and a roller supported by said tube;

whereby said roller rotates and allows bulk material to move freely past said brace during the loading and unloading processes.

2. The cross brace and top rail system of claim 1, further comprising:

a first endcap fixedly attached to said brace near a first end of said roller;

a second endcap fixedly attached to said brace near a second end of said roller; and wherein said roller is an elongated cylinder loosely supported on said brace, whereby vertical and lateral movements of said roller are allowed to permit free movement of said cargo.

3. The cross brace and top rail system of claim 2, further comprising:

a first bracket assembly pivotally supporting said first end of said brace and fixedly mounted relative to said first top rail; and a second bracket assembly pivotally supporting said second end of said brace and fixedly mounted relative to said second top rail.

4. The cross brace and top rail system of claim 1, wherein said first and second top rails are extrusions having upper, side and lower portions of different cross sectional thicknesses to achieve increased strength and limited material for minimum weight.

5. The cross brace and top rail system of claim 4, wherein said top rail extrusions are substantially thicker across the upper portion;

whereby damage resulting from loading bulk material is minimized.

6. The cross brace and top rail system of claim 1, wherein said roller is loosely supported on said brace.

7. A cross brace and top rail system for use in a bulk material container to prevent damage to said container and to remove obstructions to cargo during loading and unloading, comprising:

first and second top rails; and a combined brace and roller assembly having first and second ends, said first end supported relative to said first top rail, said second end supported relative to said second top rail;

whereby said brace and roller assembly rotates and allows bulk material to move freely during the loading and unloading processes.

\* \* \* \* \*